United States Patent
Swarr et al.

(10) Patent No.: US 7,839,431 B2
(45) Date of Patent: Nov. 23, 2010

(54) IMAGE PROCESSING SYSTEM AND METHOD FOR IMPROVING REPEATABILITY

(75) Inventors: Lonnel J. Swarr, Lancaster, PA (US); Sezai Sablak, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 703 days.

(21) Appl. No.: 11/550,836

(22) Filed: Oct. 19, 2006

(65) Prior Publication Data

US 2008/0094480 A1    Apr. 24, 2008

(51) Int. Cl.
*H04N 7/18* (2006.01)
(52) U.S. Cl. .............................. 348/95; 348/94; 348/143
(58) Field of Classification Search ................. 348/143, 348/144, 148, 149, 154, 155, 161
See application file for complete search history.

(56) References Cited

U.S. PATENT DOCUMENTS

| | | | |
|---|---|---|---|
| 5,850,254 A * | 12/1998 | Takano et al. ................ | 348/148 |
| 6,681,056 B1 | 1/2004 | Tseng et al. | |
| 6,760,063 B1 * | 7/2004 | Kamei ...................... | 348/211.8 |
| 6,781,625 B2 * | 8/2004 | Hayashi ....................... | 348/252 |
| 6,834,250 B2 * | 12/2004 | Uchiyama et al. .......... | 702/150 |
| 7,732,768 B1 * | 6/2010 | Haigh et al. ................. | 250/332 |
| 2002/0167537 A1 | 11/2002 | Trajkovic | |
| 2004/0027451 A1 | 2/2004 | Baker | |
| 2004/0100563 A1 | 5/2004 | Sablak et al. | |
| 2004/0119819 A1 | 6/2004 | Aggarwal et al. | |
| 2004/0151374 A1 | 8/2004 | Lipton et al. | |
| 2005/0168574 A1 | 8/2005 | Lipton et al. | |
| 2005/0172695 A1 * | 8/2005 | Furze et al. .................. | 73/1.01 |
| 2005/0185058 A1 | 8/2005 | Sablak | |
| 2005/0190989 A1 * | 9/2005 | Kondo et al. ................. | 382/293 |
| 2005/0270371 A1 | 12/2005 | Sablak | |
| 2005/0270372 A1 | 12/2005 | Henninger, III | |
| 2005/0275723 A1 | 12/2005 | Sablak et al. | |
| 2005/0280707 A1 | 12/2005 | Sablak et al. | |
| 2006/0023786 A1 | 2/2006 | Li et al. | |
| 2006/0033813 A1 | 2/2006 | Provinsal et al. | |
| 2006/0062296 A1 | 3/2006 | Li et al. | |
| 2006/0184013 A1 * | 8/2006 | Emanuel et al. ............. | 600/426 |

FOREIGN PATENT DOCUMENTS

GB        2 411 532 A       8/2005

OTHER PUBLICATIONS

Search Report for EP Application No. 07011437.6-2218 issued by the European Patent Office on Dec. 21, 2007.
Sinha et al. "Pan-Tilt-Zoom Camera Calibration and High-Resolution Mosaic Generation" Computer Vision and Image Understanding Academic press, San Diego, CA, vol. 103, No. 3, Sep. 2006, pp. 170-183.

* cited by examiner

*Primary Examiner*—Tuan Ho
*Assistant Examiner*—Euel K Cowan
(74) *Attorney, Agent, or Firm*—Baker & Daniels LLP

(57) ABSTRACT

Embodiments of the invention relate to a dome camera assembly that is able to ensure repeatability. The dome camera assembly includes a nonvolatile storage mechanism including a stored video image and a corresponding stored camera position. The assembly may further include an image capturing device for capturing a current video image after the camera moves to the stored camera position. An image processing component compares the current video image with the stored video image and determines an offset amount between the current video image and the stored video image. An adjustment mechanism adjusts a current camera position in accordance with the determined offset amount to facilitate repeatability.

25 Claims, 6 Drawing Sheets

IMAGE PROCESSING SYSTEM AND METHOD FOR IMPROVING REPEATABILITY

TECHNICAL FIELD

Embodiments of the present invention relate to image processing. More particularly, embodiments of the invention are directed image processing to improve video camera repeatability.

BACKGROUND OF THE INVENTION

Currently, in the security industry, dome camera assemblies are frequently used for video surveillance. The dome cameras may be used to monitor multiple areas in a place of business such as a bank, retail store, or casino. Typically, these surveillance systems may be monitored by an operator. The operator may select pre-programmed camera positions or repetitive sequences in rapid succession.

A dome camera assembly may include a housing, a camera, a bubble for the camera to look through, a pan motor, and a tilt motor. The camera may be a digital camera including a charge coupled device (CCD) for image capture. A microprocessor or digital signal processor (DSP) controls the pan and tilt motors by moving the position of the camera both horizontally and vertically. A typical dome camera assembly in the Closed Circuit Television Industry (CCTV) has the capability to pan the camera in one direction without ever having to stop and change direction. Furthermore, the camera typically has the ability to tilt at least 90° in the vertical direction. In many cases, the camera has a variable zoom lens, which satisfies applications where both a wide and a narrow Field of View (FOV) are required. Variability of the pan, tilt, and zoom positions of the camera give the operator the ability to view the entire hemisphere of the bubble.

A dome camera assembly usually has the ability to store pan, tilt, and zoom (PTZ) position values or prepositions into non-volatile memory. These stored prepositions or shots can be recalled at a later time either by an operator or automatically if an event is detected (e.g., an alarm triggered by a door opening). When a preposition is recalled, the microprocessor or DSP moves the camera to the pan, tilt, and zoom position that was stored in memory.

Today, the majority of dome cameras use stepper motors for pan, tilt, and zoom operations. Stepper motors have advantages over other motor types because the stepper motors can be controlled in an open loop system and because stepper motors do not require expensive sensing and feedback devices such as optical encoders. Stepper motors have predetermined step angles (e.g., 1.8°/step), and therefore, the position of the camera can always be known based on recorded input step pulses to the motors.

However, because such assemblies do not include a mechanism that provides position feedback, the actual position of a recalled PTZ preposition is assumed based on the step count. Any position errors are estimated based on design calculations and test measurements, but the actual position errors in the field are unknown. The position accuracy of a recalled PTZ preposition is known as repeatability.

The repeatability of a dome camera is based on a number of factors. The pan and tilt mechanisms often include reduction gears, belts, and linkage mechanism that couple the motor to the camera. Repeatability error of a recalled preposition may be due to hysteresis and backlash coming from the error buildup of the total pan/tilt drive mechanism.

Accordingly, a system is needed that is able to determine position error and adjust camera positioning in order to minimize repeatability error without increasing complexity and cost.

BRIEF SUMMARY OF THE INVENTION

In one aspect, a system is provided for improving camera repeatability based on a stored video image and a stored camera position corresponding to the stored video image. The system may include image processing components for comparing a current video image captured at the stored camera position with the stored video image by using a stationary object in the stored video image and the current video image to determine a position offset. The system may additionally include an adjustment mechanism for adjusting a current camera position based on the determined position offset to align the current video image with the stored video image.

In an additional aspect, a camera assembly is provided. The camera assembly may include nonvolatile storage mechanism storing a stored video image and a corresponding stored camera position and an image capturing device for capturing a current video image by moving the camera to the stored camera position. The camera assembly may additionally include image processing components for comparing the current video image with the stored video image and determining an offset amount between the current video image and the stored video image. The camera assembly may also include an adjustment mechanism for adjusting a current camera position in accordance with the determined offset amount to facilitate repeatability.

In yet another aspect, a method is provided for improving camera repeatability. The method may include storing a video image and a camera position corresponding to the stored video image and returning the camera to the stored camera position and capturing a current video image. The method may additionally include comparing the current video image to the stored video image and determining an offset amount. The method may further include adjusting a current camera position in accordance with the offset amount in order to align the current video image with the stored video image.

BRIEF DESCRIPTION OF THE DRAWINGS

The present invention is described in detail below with reference to the attached drawings figures, wherein.

Figure 1:
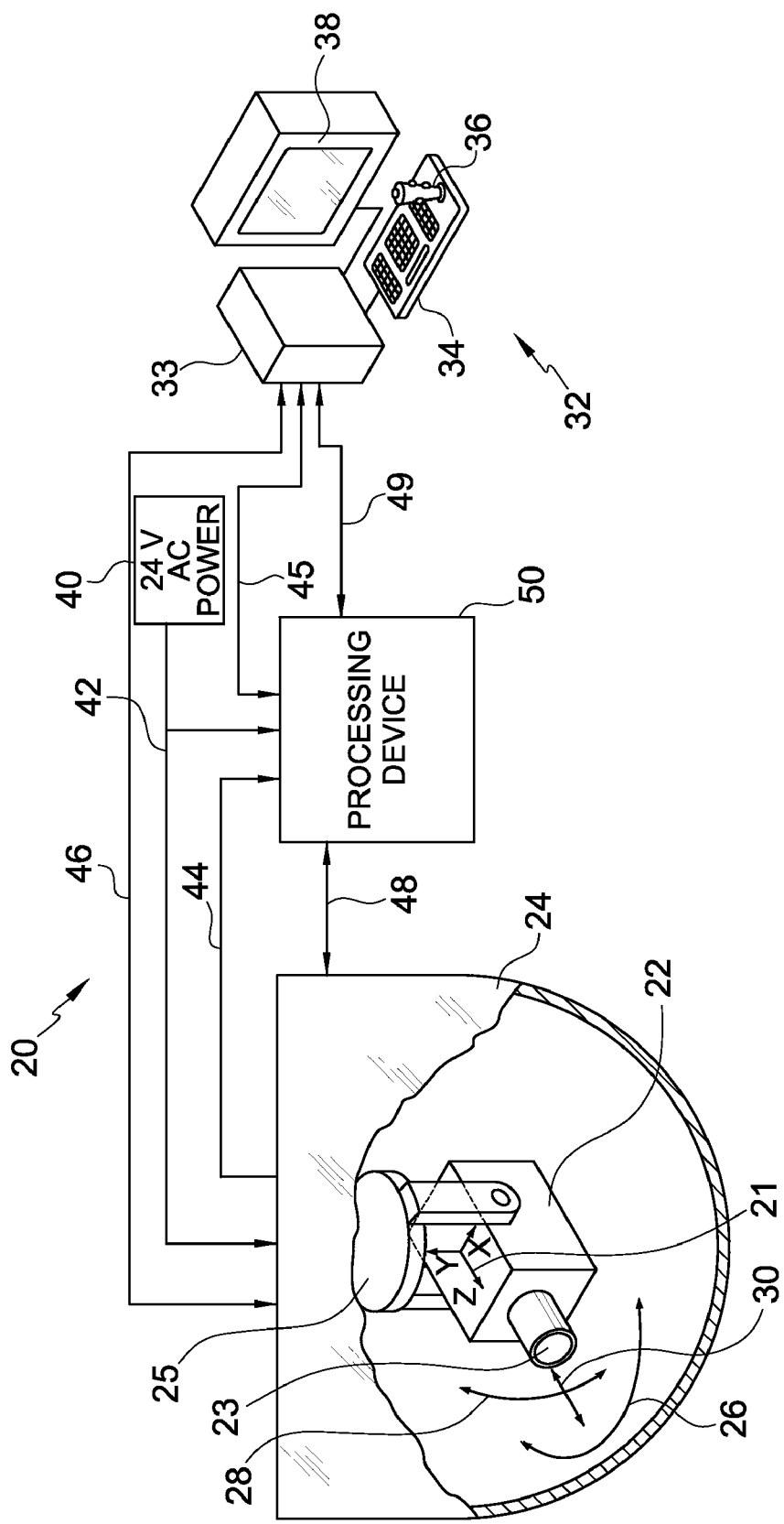
FIG. 1 is a schematic view of a video surveillance system including a dome camera assembly in accordance with an embodiment of the present invention.

Corresponding reference characters indicate corresponding parts throughout the several views. Although the exemplification set out herein illustrates embodiments of the invention, the embodiments disclosed below are not intended to be exhaustive or to be construed as limiting the scope of the invention to the precise forms disclosed.

DETAILED DESCRIPTION OF PREFERRED EMBODIMENTS

Embodiments of the present invention are directed to a system and method for improving repeatability of a dome camera. The system may incorporate image storage and processing components that implement comparisons and corrections to improve repeatability accuracy.

A video camera in a CCTV application outputs continuous analog or digital video according to recognized standards (e.g., National Television Standards Committee (NTSC), Phase Alternate Line (PAL), Sequential Couleurs A Memoire (SECAM), etc.). Continuous video is made up of multiple still picture frames transmitted at a rate dependent upon the video standard. Each picture frame has a predetermined number of pixels based on the resolution of the camera's image sensor, i.e. CCD, and/or the resolution of a video decoder. Embodiments of the invention use the pixel information to make adjustments for misalignments due to repeatability inaccuracies.

FIG. 1 is a block diagram illustrating a video surveillance system 20 that incorporates a dome camera assembly. System 20 includes a camera 22 which is located within a partially spherical enclosure 24 and mounted on support 25. Stationary support 25 may take many forms, such as an outwardly extending support arm extending from an exterior edge of a building which may subject the supported camera 22 to unintentional movement resulting from wind, vibrations generated by the camera motors, nearby machinery or a myriad of other sources. Enclosure 24 may be tinted to allow the camera to acquire images of the environment outside of enclosure 24 and simultaneously prevent individuals in the environment being observed by camera 22 from determining the orientation of camera 22. Camera 22 includes a controller and motors which provide for the panning, tilting and adjustment of the focal length of camera 22. Panning movement of camera 22 is represented by arrow 26, tilting movement of camera 22 is represented by arrow 28 and the changing of the focal length of the lens 23 of camera 22, i.e., zooming, is represented by arrow 30. As shown with reference to coordinate system 21, panning motion may track movement along the x-axis, tilting motion may track movement along the y-axis and focal length adjustment may be used to track movement along the z-axis. In the illustrated embodiment, camera 22 and enclosure 24 are a dome camera system, such as the G3 Basic AutoDome® camera and enclosure, which are available from Bosch Security Systems, Inc., having a place of business in Lancaster, Pa. Furthermore, a camera suited for use with present invention is described by Sergeant et al. in U.S. Pat. No. 5,627,616 entitled Surveillance Camera System which is hereby incorporated herein by reference.

The system 20 may employ an automated tracking system. An example of an automated tracking system that may be employed by system 20 is described by Sablak et al. in U.S. patent publication No. 2004/0100563, published on May 27, 2004 and entitled "VIDEO TRACKING SYSTEM AND METHOD" the disclosure of which is hereby incorporated herein by reference.

System 20 also includes a head end unit 32. Head end unit 32 may include a video switcher or a video multiplexer 33. For example, the head end unit 32 may include an Allegiant brand video switcher available from Bosch Security Systems, Inc., such as a LTC 8500 Series Allegiant Video Switcher which provides inputs for up to 64 cameras and may also be provided with eight independent keyboards and eight monitors. Head end unit 32 includes a keyboard 34 and joystick 36 for operator input. Head end unit 32 also includes a display device in the form of a monitor 38 for viewing by the operator. A 24 volt a/c power source 40 is provided to power both camera 22 and a processing device 50 that is operably coupled to both camera 22 and head end unit 32.

Illustrated system 20 is a single camera application, however, embodiments of the present invention may be used within a larger surveillance system having additional cameras which may be either stationary or moveable cameras or some combination thereof to provide coverage of a larger or more complex surveillance area. One or more VCRs or other form of analog or digital recording device may also be connected to head end unit 32 to provide for the recording of the video images captured by camera 22 and other cameras in the system.

Figure 2:
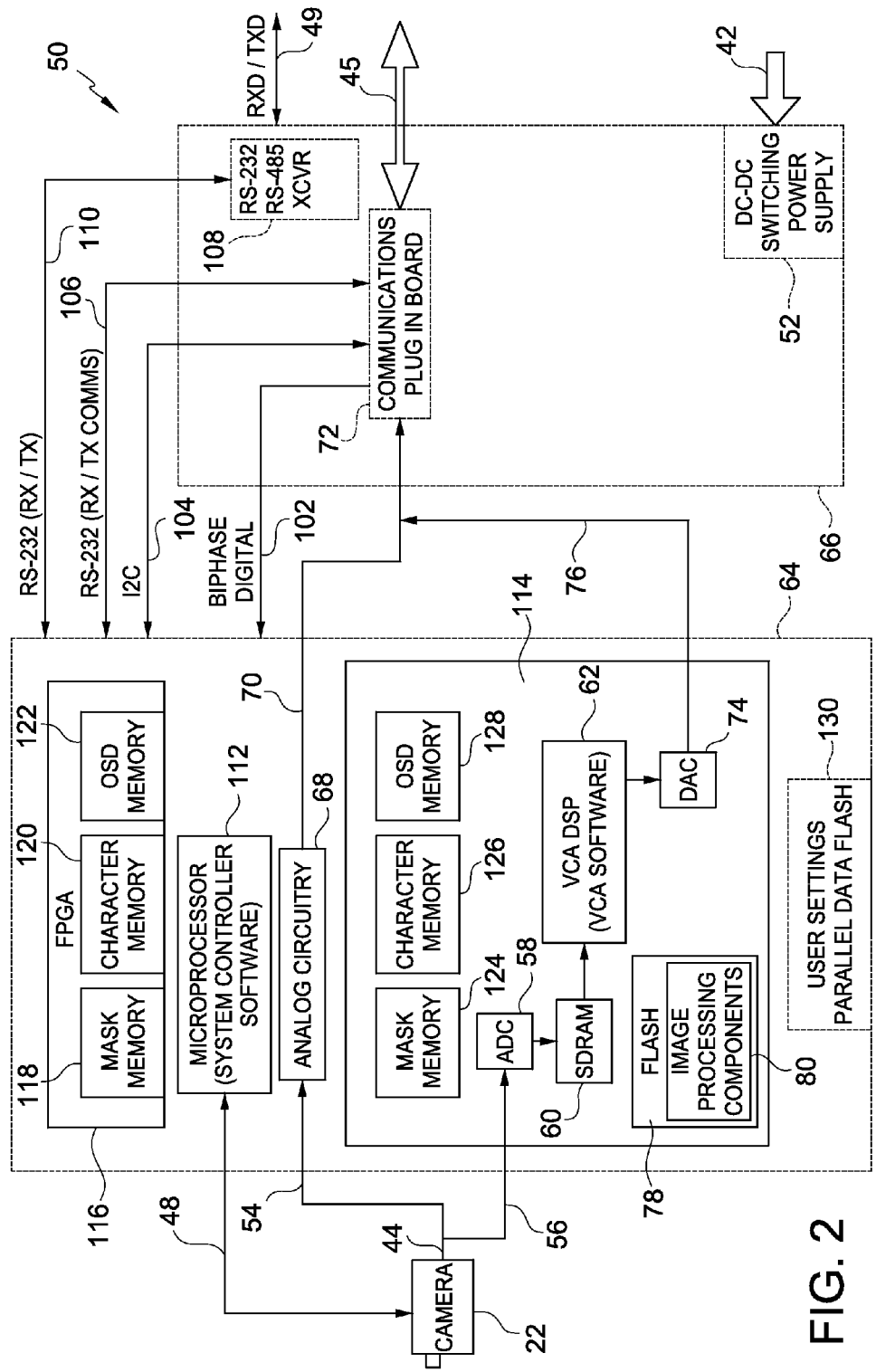
FIG. 2 is a block diagram illustrating a processing device of the video surveillance system in accordance with an embodiment of the invention.

The hardware architecture of processing device 50, in accordance with embodiments of the invention, is schematically represented in FIG. 2. In the illustrated embodiment, processing device 50 includes a system controller board 64 in communication with a power supply/IO board 66. The power line 42 connects power source 40 to converter 52 in order to provide power to processing device 50. Processing device 50 receives a raw analog video feed from camera 22 via video line 44, and video line 45 is used to communicate video images to head end unit 32. In the illustrated embodiment, video lines 44, 45 are coaxial, 75 ohm, 1 Vp-p and include BNC connectors for engagement with processing device 50. The video images provided by camera 22 can be analog and may conform to either NTSC or PAL standards. When processing device 50 is inactive, i.e., turned off, video images from camera 22 can pass through processing device 50 to head end unit 32 through analog video line 54, analog circuitry 68, analog video line 70 and communications plug-in board 72. Board 72 can be a standard communications board capable of handling biphase signals and including a coaxial message integrated circuit for allowing two-way communication over video links.

Via another analog video line 56, an analog to digital converter 58 receives video images from camera 22 and converts the analog video signal to a digital video signal. After the digital video signal is stored in a buffer, for example in the form of SDRAM 60, the digitized video images are passed to video content analysis digital signal processor (VCA DSP) 62. The DSP 62 may implement software components that will be further described below in order to improve repeatability. These software components compare a live image to a stored image having an identical PTZ position and determine offsets to facilitate correction. In embodiments of the invention, DSP 62 sends the display image and coordinate and adjustment information to digital to analog converter 74 where the video signal is converted to an analog signal. The resulting annotated analog video signal is sent via analog video lines 76 and 70 to communications plug-in board 72, which then sends the signal to head end unit 32 via video line 45. Alternatively, the system 20 may be configured so that the offset information is provided through an alternative route such as through microprocessor 112 or to the camera 22 directly.

DSP 62 may be a TMS320DM642 Video/Imaging Fixed-Point Digital Signal Processor available from Texas Instruments Incorporated. At start up, processor 62 loads a bootloader program. The boot program then copies application code 80 for image processing from a memory device such as flash memory 78 to SDRAM 60 for execution. In the illustrated embodiment, flash memory 78 provides 1 megabyte of memory and SDRAM 60 provides eight megabytes of memory. Since the application code from flash memory 78 is loaded on SDRAM 60 upon start up, SDRAM 60 is left with approximately seven megabytes of memory for video frame storage.

In the embodiment shown in FIG. 2, system controller board 64 is connected to communications plug-in board 72 via a biphase digital data bus 102, an I2C data bus 104, and an RS-232 data bus 106. System controller board 64 is connected to an RS-232/RS-485 compatible transceiver 108 via RS-232 data bus 110. A line 49, which can be in the form of an RS-232 debug data bus, communicates signals from head end unit 32 to processing device 50. The signals on line 49 can include signals that can be modified by processing device 50 before being sent to camera 22. Such signals may be sent to camera 22 via line 48 in communication with microprocessor 112. Microprocessor 112 can operate system controller software and may also be in communication with VCA components 114. Thus, VCA components such as VCA DSP 62 can send signals to camera 22 via microprocessor 112 and line 48.

System controller board 64 may also include a field programmable gate array 116 including a mask memory 118, a character memory 120, and an on screen display (OSD) memory 122. Similarly, VCA components 114 may include a mask memory 124, a character memory 126, and an on screen display (OSD) memory 128. These components may be used to mask various portions of the image displayed on screen 38 or to generate textual displays for screen 38. Finally, system controller board 64 can include a parallel data flash memory 130 for storage of user settings.

In the illustrated embodiment, processing device 50 may receive on/off commands input by a human operator. These commands may be automated in alternative embodiments. The on/off commands and other serial communications are conveyed via bi-phase line 46 between head end unit 32 and camera 22, and between processing device 50 and camera 22 via line 48. These commands may include camera adjustment commands issued by the DSP 62 in order to enhance repeatability. In the illustrated embodiment, processing device 50 is provided with a sheet metal housing and mounted proximate camera 22, however, processing device 50 may also be mounted employing alternative methods and at alternative locations. Alternative hardware architecture may also be employed with processing device 50. Such hardware should be capable of running the software and processing at least approximately five frames per second.

Processing device 50 can perform multiple functions by implementing the stored image processing components 80. Specifically, the processing device 50 captures and stores video frames and position information, compares stored information with live information, determines an offset, and corrects camera position in accordance with the offset in order to improve repeatability. The processing device 50 may also provide an automated tracking system wherein the processing device 50 is used to identify moving target objects in the FOV of the camera and then generate control signals which adjust the pan, tilt, and zoom settings of the camera to track the target object and maintain the target object within the FOV of the camera.

Figure 3A:
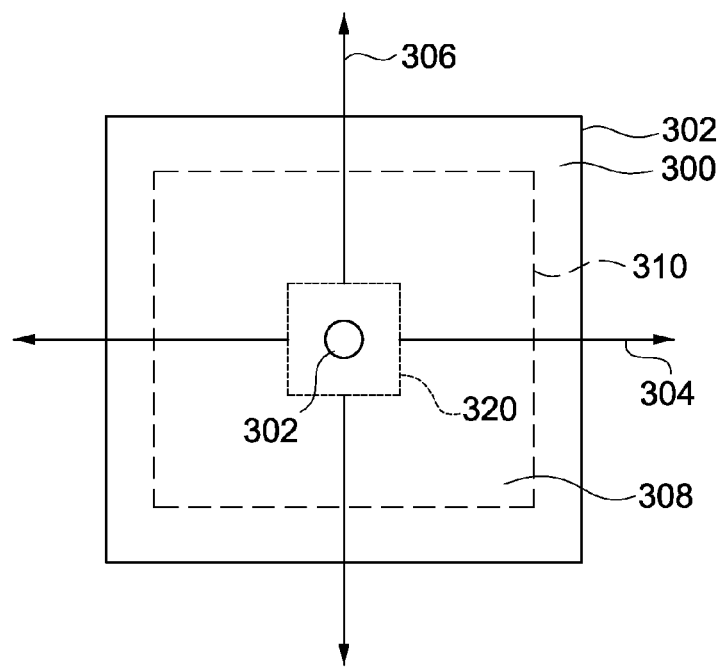
FIGS. 3A and 3B illustrate a sample of a CCD image captured by the video surveillance system identifying a region of interest.

FIGS. 3A, 3B, and 4A-4C illustrate general concepts underlying the image processing system 80 implemented by the processing device 50 for improving repeatability. FIG. 3A illustrates a sample of a CCD image 300 defined by a boundary 302. As set forth above, the camera 22 includes a CCD that captures a four-sided CCD video image 300. The processing device 50 may identify a region of interest 308 as defined by the boundary illustrated by the dashed line 310. More particularly, the processing device 50 identifies a display image 308 defined by display image boundary 310 for display on the monitor 38. In one embodiment, the selected portion of the CCD video image, i.e. display image 308 includes approximately between 60% and 90% of the CCD video image. In a preferred embodiment, CCD image 300 can be approximately 30% larger than the display image 308 defined by the display image boundary 310. By utilizing a display image that is smaller than the CCD image, the processing device 50 can adjust the positions of the boundaries defining the display image relative to the entire CCD image for images acquired at discrete times in order to counteract errors.

The processor 50 may further define a template 320 inside of the region of interest 308 of the image 300. As will be further described below, the selection of the template 320 may be utilized in a correlation process such as Normalized Cross Correlation (NCC). The template 320 may be applied over a stationary image feature. Additionally, the processor 50 may identify a centroid ($P_0$) 302 of the region of interest 308. The centroid 302 may also be implemented in the cross correlation technique, which is further described below. Also illustrated in FIG. 3A, axes 304 and 306 represent the x and y axes.

Figure 3B:
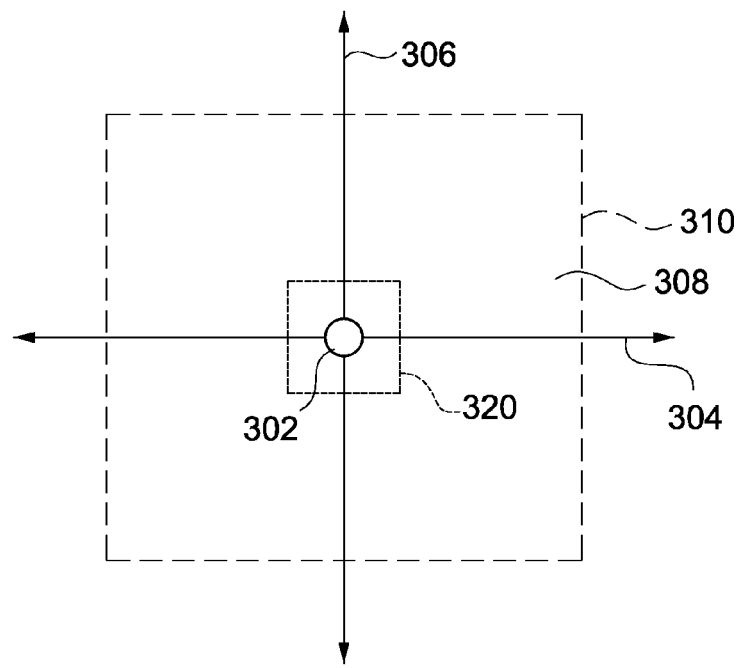

FIG. 3B illustrates the image 308 captured by the CCD as it will appear to an operator subsequent to the processing described with reference to FIG. 3A. FIG. 3B limits viewing to the region of interest 308 as defined by the boundary 310. As in FIG. 3A, the dotted line 320 illustrates a template inside of the region of interest 308 of the image 300. The centroid 302 is shown as forming an origin of the x-axis 304 and the y-axis 306.

Figure 4A:
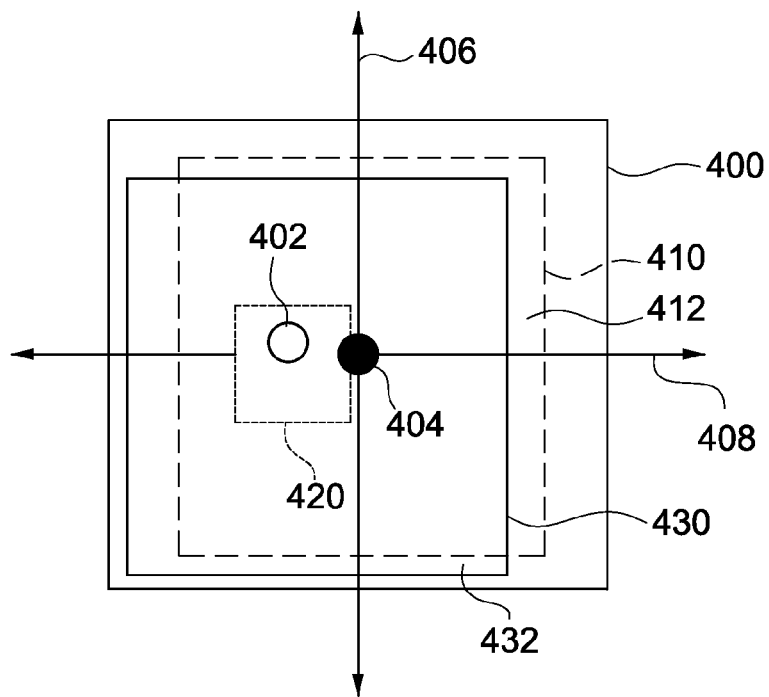
FIGS. 4A, 4B, and 4C illustrate a CCD image including an image for display without correction for repeatability and an image for display with correction for repeatability.
Figure 4B:
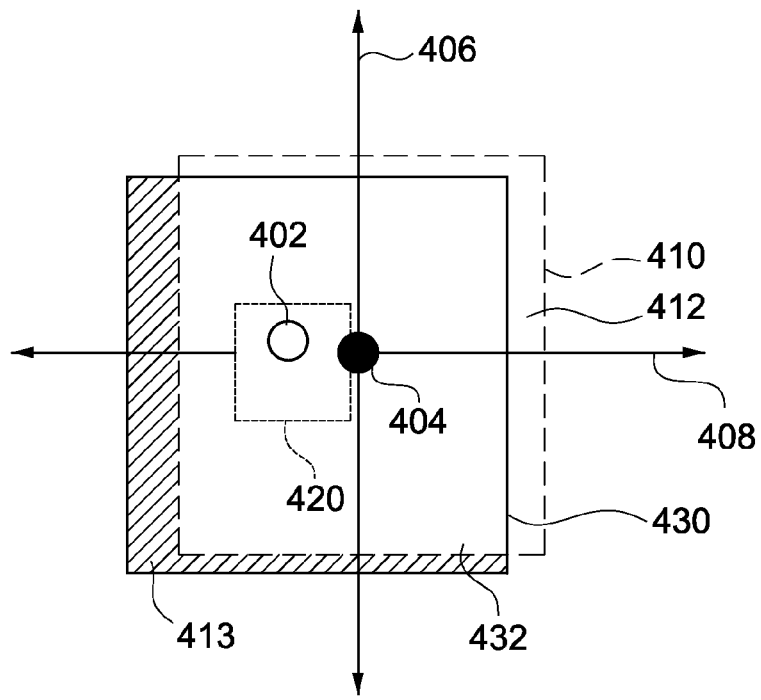
Figure 4C:
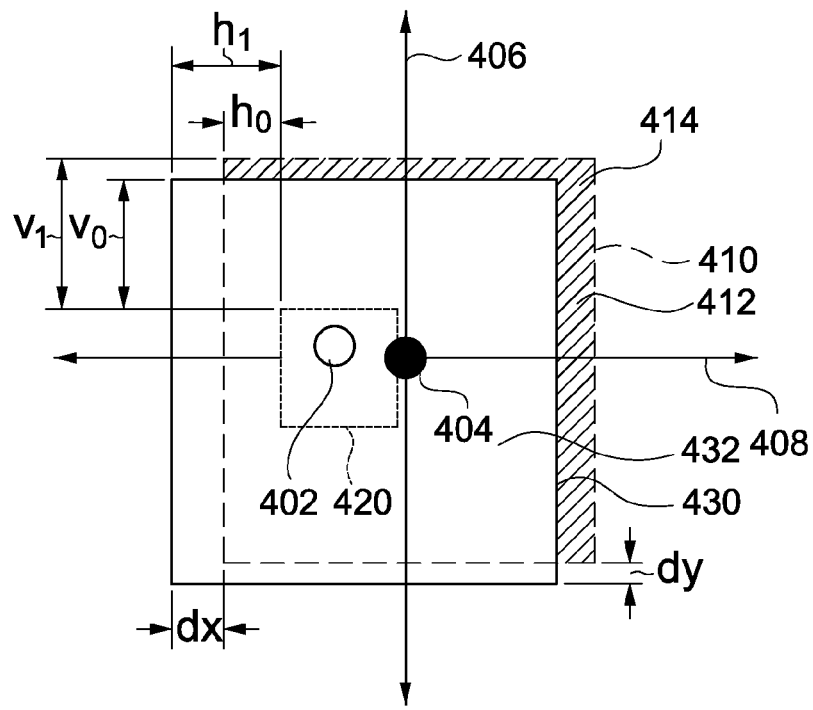

FIGS. 4A-4C illustrate a correction sequence for improving repeatability. Explanation of the processes of FIG. 5 and FIG. 6 facilitate understanding of the sequence shown in FIGS. 4A-4C.

Figure 5:
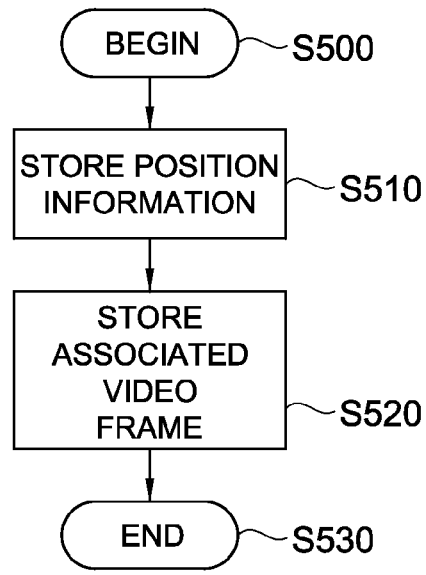
FIG. 5 is a flowchart illustrating an image capture and recordation process in accordance with an embodiment of the invention.

With reference to FIG. 5, during standard operation, the camera 22 may begin operation in S500 and may store position information, or more specifically PTZ values generated in accordance with stepper motor motion for each position visited in S510. Furthermore, the video frame associated with each position may be stored in non-volatile memory such as FLASH memory 78 or other non-volatile memory, and be cross referenced with its PTZ value in S520. As set forth above with respect to FIGS. 3A and 3B, either an entire video frame or a portion of a video frame may be stored in connection with each PTZ position. This process may be repeated during camera motion and may end in S530. Storing position information along with the captured video frame facilitates subsequent comparison in order to correct camera positioning and improve repeatability.

Thus, when surveillance system stores a PTZ position of a particular scene, it saves a video frame or part of a video frame in non-volatile memory along with the PTZ data. The amount of video data saved is based on image resolution. Video decoder outputs have resolutions of 720(H)×480(V) for NTSC and 720(H)×576(V) for PAL. If, for example, the decoder puts out 1 byte/pixel, then the data size of one whole frame is equivalent to 345.6 Kbytes for NTSC and 414.72 Kbytes for PAL.

The saved file sizes can be reduced by compressing the data into something less than 1 byte/pixel and by saving only the portion of the frame that contains the critical information. The critical information in a saved video frame is the portion of the image that contains a stationary object having horizontal and vertical edges.

Figure 6:
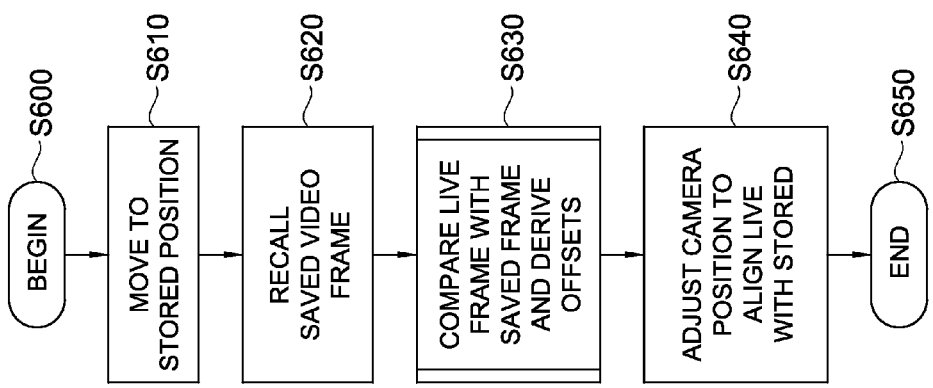
FIG. 6 is a flowchart illustrating a process implemented upon returning the camera to a stored preposition.

FIG. 6 illustrates a process performed when repeatability is desired in accordance with an embodiment of the invention. The process begins in S600 and the camera is moved to the stored position, either automatically or in response to an operator command, in S610. In S620, the camera recalls the saved video from non-volatile memory that is associated with the stored PTZ position. In process 630, the processor implements image processing components 80 to compare the live captured video frame with the stored video frame associated with the PTZ coordinates and derives the offsets. When a preposition is recalled and the camera has arrived at the stored PTZ position, the horizontal and vertical edges of an object in the live image will be compared to the edges of the same object in the stored image. The image processing components 80 will determine the pan, tilt, and zoom offsets by comparing the two images. The details of the process 630 will be further described below. In S640, the offsets will be given to the microprocessor or DSP that controls the pan, tilt, and zoom motors. The microprocessor or DSP will use the offsets to align the pan, tilt, and zoom positions of the camera more accurately. The processing device 50 adjusts the camera position to align the live image with the stored information and the process ends in S650.

FIG. 4A illustrates a comparison between a live image and a stored image at the same PTZ position. Thus, a sample of a newly captured live CCD image 400 and a stored previously captured image 432 having identical PTZ position components are shown. Because of errors due to imprecision of the components of the motor assembly, backlash, hysteresis or other factors, the field of view (FOV) of camera 22 changes such that the second four-sided CCD image 400 does not precisely correspond to the first four sided image. In order to enhance repeatability, the processor 50 implements image processing components 80 in order to calculate error and re-direct the camera 22 to a corrected position.

As set forth above with respect to FIG. 3A, the processor 50 may identify a region of interest 412, bounded by dashed line 410 in the live image 400. This region of interest may include a POI 404 [$P_1=(x_1,y_1)$], where 408 represents the x-axis and 406 represents the y-axis. In FIG. 4A, the newly captured region of interest 412 will be compared with a stored region of interest 432 bounded by square 430. The region of interest 432 has been stored in connection with a previously visited PTZ position that corresponds to the stepper motor position that produced the region of interest. The previously stored region of interest 432 may have a template 420 identifying a stationary object and having a POI 402 [$P_0=(x_0,y_0)$] disposed therein. As illustrated, although the regions of interest 412 and 432 overlap significantly, they are not identical. As explained above, various sources of error may be responsible for the lack of correspondence between the two regions of interest.

FIG. 4B illustrates the scenario of FIG. 4A wherein the camera position has not been corrected for repeatability. In this example, an area 413 does not include an image. Thus the camera position for capture of the live image 412 produces an image that blocks out a portion of the original image 432 and the template 420 encompassing the stationary object is located to the far left of the image. As can be seen in FIG. 4B, images 412 and 432 overlap to a considerable extent but the FOV of camera 22 has changed between the acquisition of CCD image 432 to the more recently captured CCD image 412. The images 412 and 432 are superimposed on one another as they would successively appear on the screen of monitor 38 without any adjustment of camera position to enhance repeatability.

FIG. 4C illustrates the scenario of FIG. 4A, wherein the PTZ camera position has been adjusted to enhance repeatability through PTZ position adjustment. Thus, the camera position will enable display of the originally captured image area 432. In this example, the area 414 does not include an image. A common stationary feature 420 is identified in each of these images to clarify the relative movement of the FOV that has taken place between the acquisition of the two images. The actual horizontal translation $d_x$ (generally corresponding to panning movement of camera 22) and vertical translation $d_y$ (generally corresponding to tilting movement of camera 22) of feature 420 relative to the CCD image boundaries 430, 410 that actually took place in the time period between the acquisition of the two CCD images 412, 432 is schematically represented in FIG. 4C. The vertical, i.e., in the tilt direction, change in position $d_y$, and the horizontal, i.e., in the panning direction, change in position $d_x$ of feature 420 relative to the display image boundaries is representative of the vertical (tilt) movement and horizontal (pan) movement of camera 22 that occurred due to various sources of error between the storage of the original image 432 and the capture of CCD image 412 by camera 22 and is equivalent to the change in position of feature 420 relative to CCD image boundaries.

In other words, $d_y$ is equivalent to the difference between vertical distances between feature 420 and corresponding horizontal edges of display image boundaries 410 and 430, respectively. That is, $d_y=|v0-v1|$. Similarly, $d_x$ is equivalent to the difference between horizontal distances $h_0$ and $h_1$ between feature 420 and corresponding vertical edges of display image boundaries 410 and 430, respectively. That is, $d_x=|h0-h1|$.

In order to enhance repeatability, the processor 50 implements image processing components 80 to determine the relationship between the live image and the stored image of FIG. 4C and correct the camera positioning based on that relationship. The determination of the values of $d_y$ and $d_x$ is performed by processing device 50 based upon an analysis of the content of the two CCD images 412, 432.

Returning to FIG. 6, the process 630 of image comparison will be further explained. Generally, in feature tracking approaches, a window or template is placed around a feature of interest using a local search algorithm. For applications in which camera motion is the main source of motion in the video sequence, the feature tracking approach estimates this motion. By applying a correlation to an original feature position, a new estimate of feature location is obtained.

After a region of interest is identified, the centroid $P_0$ of the region is computed to specify a point of interest (POI). This estimate can then be refined using a local method.

A tracking calculation may be performed by simply switching a first image region or frame $f_t$ with $f_{t-1}$ and computing motion based on the inverted pairs, where $f_t$ represents a frame at a time t and $f_{t-1}$ represents an immediately preceding frame at a time t−1. The result of the tracking process estimates the motion from $f_t$ to $f_{t-1}$. A simple transformation may be used to obtain the forward motion from the backward motion.

In order to improve repeatability, the POI ($P_0$) should remain the centroid of the current image. To accomplish this objective the image processing components derive the two-dimensional location of the POI in the scene and dictate control of the Pan/Tilt Motor to put the POI in the centroid of the image.

After the POI is found, the system translates the camera position by controlling the PTZ motor according to the correlation, such that the POI has desired values. Visual feature tracking can utilize dynamic information, e.g., information of previous frames. The information obtained about the feature from previous frames provides some prior knowledge about the feature's current state. Combining the prior knowledge with the likelihood between the hypothetical feature and the current frame image, a normalized cross correlation (NCC) method in Eq. [4] is obtained.

The two dimensional feature tracking problem is to find the motion, or simply, location since a point has no rotation or in-depth translation, of a feature point, e.g., a block of image center, in a temporal image sequence, as formally defined as follows. Given an image sequence $I=\{I_0, I_1, \ldots, I_{n-1},\}$ and a feature point $p_k(x_k, y_k)$ (k=0 . . . i−1) in the previous i frame images, the tracking problem can be described as finding a motion vector $T_t=(d_x, d_y)$ to locate its position $p_t(x_t, y_t)$ in the successive image, that is: $p_t=p_{t-1}+T_t$ Matching techniques which may be used to register or align two images having overlapping content are well known in the art and used in a wide variety of computer vision and video processing applications. Two well-known methods are normalized correlation-based template matching and feature matching. For example, the identification of a stationary object such as feature 420 in each of the two images might be accomplished using a feature matching approach. One well known method of identifying features in video images is a corner detection method which analyzes the images to identify locations, or corners, in the image where there is a relatively sharp change in the intensity level of nearby pixels. These corners are then compared and matched in the two separate images.

Various template matching approaches are known in the art. Two well known approaches to template matching are a sum of square differences approach and a normalized cross-correlation approach. Although a sum of square differences approach can be used with the present invention, the normalized cross-correlation approach is implemented in a preferred embodiment of the invention. Template matching using cross-correlation is based upon squared Euclidean distances:

$$d_{f,t}^2(u, v) = \sum_{x,y} [f(x, y) - t(x-u, y-v)]^2 \quad [1]$$

wherein f is the image, e.g, second CCD image 412, and the summation is over x, y under the window, e.g., first display image 432, containing a feature t positioned at (u, v). The expansion of $d^2$ provides:

$$d_{f,t}^2(u,v) = \Sigma[(f^2(x,y) - 2f(x,y)t(x-u,y-v) + t^2(x-u,y-v))] \quad [2]$$

The term $\Sigma t^2$ (x−u,y−v) is constant. If the term $\Sigma f^2(x,y)$ is approximately constant then the remaining cross-correlation term $$c(u, v) = \sum_{x,y} f(x, y)t(x-u, y-v) \quad [3]$$

is a measure of the similarity between the input image f and the reference image t. The correlation coefficient c(u, v) overcomes dependency on the size of the feature and changing light conditions by normalizing the image and feature vectors to unit length, yielding a cosine-like correlation coefficient. Hence, the NCC based method is as defined by:

$$NCC = \gamma(u, v) = \frac{\sum_{x,y}[f(x, y) - \bar{f}][t(x-u, y-v) - \bar{t}]}{\sqrt{\left\{\sum_{x,y}[f(x, y) - \bar{f}]^2 \sum_{x,y}[t(x-u, y-v) - \bar{t}]^2\right\}}} \quad [4]$$

where f is input image and t is the reference image. The computation at a particular location is determined to be the POI after completing the sum if the estimate suggests that the location (u,v) corresponds to an excellent match.

$$\begin{cases} d_x = (x_0 - u) \\ d_y = (y_0 - v) \end{cases} \quad [5]$$

Here, $x_0$, $y_0$ are the center coordinates of the stationary image region and u, v are estimated feature tracking positions to translate by the amount of differences $d_x$, $d_y$ in each direction from the center coordinates.

Figure 7:
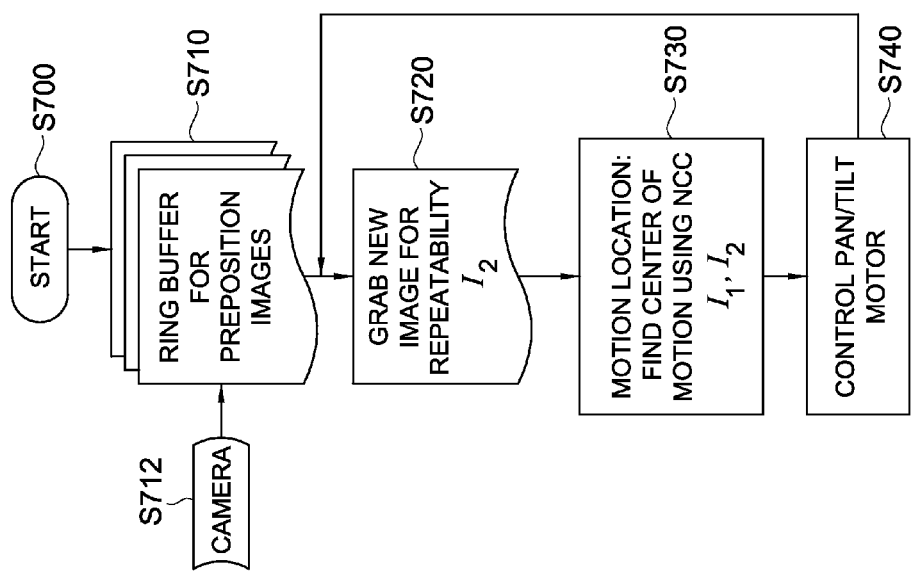
FIG. 7 is a flowchart illustrating an embodiment of a method for facilitating repeatability.

FIG. 7 illustrates a more detailed view of the procedure implemented by the surveillance system to facilitate repeatability. The process starts in S700 and initialization may occur by copying application code from flash memory 78 for execution. The camera operates in S712 and checks non-volatile memory for stored preposition images in S710. In S720, the camera grabs a new or live image that requires repeatability correction. In S730 motion location is performed by finding the center of motion and the extent of motion using NCC as described above. Motion location operates to find the center of motion for vertical and horizontal axes with a fixed template size on a stationary region of the image. In S740, the processing device controls the motor in accordance with the motion location. The accuracy of motor control depends on the amount of pixel translation in the vertical and horizontal directions. The process continues each time the camera is directed to a repeated position. Optionally, corrected PTZ positions may be calculated and stored in place of the originally stored PTZ positions.

The accuracy of the alignment produced in S740 depends on the resolution of the image and the FOV of the lens. A majority of dome cameras have variable zoom lenses, which means the FOV varies with the magnification of the lens. The FOV of a lens is based on the size of the image sensor and the focal length of the lens. FOV can be expressed horizontally, vertically, and diagonally. The FOV may be calculated as follows:

$$FOV=2\times\arctan((\text{size of imager}/2)/\text{focal length}) \quad [6]$$

The size of a CCD imager is derived from the individual size of a pixel and the total number of effective pixels. For example, if a ¼ inch standard high resolution CCD imager is used, the horizontal and vertical imager size can be calculated by multiplying the size of each pixel by the total number of effective pixels as illustrated in Table 1 below:

TABLE 1

|  | | Size of Imager | |
| --- | --- | --- | --- |
| ¼ inch NTSC imager | | | |
| Size of 1 pixel | H    V | 4.75 μm | 5.55 μm |
| Total # of pixels | 811  508 | 3852.25 μm | 2819.4 μm |
| Total size of imager | | 3.85 mm | 2.82 mm |

TABLE 1-continued

| | | | Size of Imager | |
|---|---|---|---|---|
| Effective # of pixels | 768 | 494 | 3648 μm | 2741.7 μm |
| Effective size of imager | | | 3.65 mm | 2.74 mm |
| ¼ inch PAL imager | | | | |
| Size of 1 pixel | H | V | 4.85 μm | 4.65 μm |
| Total # of pixels | 795 | 595 | 3855.75 μm | 2766.75 μm |
| Total size of imager | | | 3.85 mm | 2.77 mm |
| Effective # of pixels | 752 | 582 | 3647.2 μm | 2706.3 μm |
| Effective size of imager | | | 3.65 mm | 2.70 mm |

Focal length can be obtained from the specification sheet of the manufacturer for the lens. Adding to the example above, a 25× magnification lens designed for a ¼ inch CCD imager might have a focal length ranging from 4.0 mm to 100 mm. If these focal length numbers are substituted into the FOV equation above along with the effective imager sizes in this example, the following are the resulting FOV ranges in Table 2 below:

TABLE 2

| Imager type | FOV range |
|---|---|
| NTSC | 49.0°~2.1° (H) |
| | 37.8°~1.6° (V) |
| PAL | 49.0°~2.1° (H) |
| | 37.4°~1.6° (V) |

Once the FOV of the lens is known, then the accuracy of the preposition alignment can be calculated. This invention will be able to align the image to ±1 pixel.

Alignment Accuracy=FOV/# of pixels

The pixel information to be used will most likely be with regards to the digital output of a video encoder and not the actual CCD pixels. As set forth above, the standard resolution for a digital D1 video frame is 720 (H)×480 (V) for NTSC and 720 (H)×576 (V) for PAL. These are the horizontal and vertical pixel numbers that are used in the calculation for the pan and tilt alignment accuracy. Continuing with the example, a standard D1 resolution frame of video and the FOV values calculated above will provide the alignment accuracy for pan and tilt prepositions in a dome camera.

| Video Standard | Alignment accuracy |
|---|---|
| NTSC | ±0.068°~±0.003° (H) |
| | ±0.079°~±0.003° (V) |
| PAL | ±0.068°~±0.003° (H) |
| | ±0.065°~±0.003° (V) |

It can be seen from the example that the alignment accuracy using the image pixel information improves as the FOV decreases. This is the desired effect since the image's magnification increases as the FOV decreases, and any inaccuracies get magnified along with a higher magnified image.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for improving camera repeatability based on a stored video image and a stored camera position corresponding to the stored video image, the system comprising:
   a drive mechanism configured to move the camera to a plurality of different positions during a surveillance operation;
   a memory for storing a plurality of video images as a camera moves to the plurality of different positions and for storing a camera position corresponding to each stored video image, the drive mechanism being configured to return the camera to a selected stored camera position;
   image processing components for comparing a current video image captured at the selected stored camera position with the stored video image previously captured at the selected stored camera position by using a stationary object in the stored video image and the current video image to determine a position offset; and
   an adjustment mechanism for adjusting a current camera position based on the determined position offset to align the current video image with the stored video image.

2. The system of claim 1, wherein the stored video image is a portion of an originally captured video image identified as a region of interest.

3. The system of claim 1, wherein the image processing components compare vertical and horizontal edges of the stationary object in the stored video image with vertical and horizontal edges of the stationary object in the current video image.

4. The system of claim 3, wherein the image processing components determine pan, tilt, and zoom position offsets based on the horizontal and vertical edge comparisons.

5. The system of claim 1, wherein the stored camera position comprises a pan, tilt, and zoom position.

6. The system of claim 1, wherein the adjustment mechanism comprises a processor for adjusting a camera motor.

7. The system of claim 1, further comprising nonvolatile memory for storing the plurality of stored camera positions and the plurality of stored video images.

8. The system of claim 1, wherein the adjustment mechanism aligns the images to an alignment accuracy of one pixel.

9. A camera assembly comprising:
   a nonvolatile storage mechanism including a plurality of stored video images and a corresponding stored camera position for each of the plurality of stored video images;
   an image capturing device for capturing a current video image upon movement of the camera to a selected one of the stored camera positions;
   an image processing component for comparing the current video image with the stored video image previously captured at the selected stored camera position and determining an offset amount between the current video image and the stored video image; and
   an adjustment mechanism for adjusting a current camera position in accordance with the determined offset amount to facilitate repeatability.

10. The system of claim 9, further comprising a dome camera assembly having selectable pan, tilt, and zoom positions.

11. The system of claim 9, wherein each stored video image is a portion of an originally captured video image identified as a region of interest.

12. The system of claim 9, wherein the image processing components compare vertical and horizontal edges of the stationary object in the stored video image with vertical and horizontal edges of the stationary object in the current video image.

13. The system of claim 10, wherein the image processing components determine pan, tilt, and zoom position offsets based on the horizontal and vertical edge comparisons.

14. The system of claim 10, wherein each stored camera position comprises a pan, tilt, and zoom position.

15. The system of claim 9, wherein the adjustment mechanism comprises a processor for adjusting a camera motor.

16. The system of claim 9, wherein the adjustment mechanism aligns the images to an alignment accuracy of one pixel.

17. A method for improving camera repeatability, the method comprising:
    moving a camera to a plurality of different positions during a surveillance operation;
    storing a plurality of video images as a camera moves to the plurality of different positions;
    storing a camera position corresponding to each stored video image;
    returning the camera to a selected one of the stored camera positions and capturing a current video image at the selected stored camera position;
    comparing the current video image to the stored video image corresponding to the selected stored camera position and determining an offset amount; and
    adjusting a current camera position in accordance with the offset amount in order to align the current video image with the stored video image.

18. The method of claim 17, further comprising storing the plurality of video images and corresponding camera positions in nonvolatile memory.

19. The method of claim 18, further comprising storing the corresponding camera positions in terms of pan, tilt, and zoom values.

20. The method of claim 18, further comprising storing only a portion of an original video image corresponding to a region of interest of the original video image.

21. The method of claim 17, further comprising returning the camera to another stored camera position upon receiving an operator command.

22. The method of claim 17, wherein comparing the current video image to the stored video image comprises comparing vertical and horizontal edges of a stationary object in the stored video image with vertical and horizontal edges of the stationary object in the current video image.

23. The method of claim 22, wherein comparing the current video image to the stored video image comprises determining pan, tilt, and zoom position offsets based on the horizontal and vertical edge comparisons.

24. The method of claim 17, wherein adjusting the current camera position comprises causing a processor to move a camera motor.

25. The method of claim 17, wherein adjusting the current camera position comprises aligning the images to an alignment accuracy of one pixel.

* * * * *